United States Patent
Oberhauser

(10) Patent No.: US 6,563,443 B2
(45) Date of Patent: May 13, 2003

(54) METHOD AND DEVICE FOR ABSOLUTE POSITION DETERMINATION

(75) Inventor: Johann Oberhauser, Vachendorf (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 09/972,773

(22) Filed: Oct. 5, 2001

(65) Prior Publication Data
US 2002/0041241 A1 Apr. 11, 2002

(30) Foreign Application Priority Data
Oct. 6, 2000 (DE) ......................... 100 49 502

(51) Int. Cl.$^7$ ............................................. H03M 1/22
(52) U.S. Cl. ............................................ 341/115; 341/7
(58) Field of Search ............................ 341/7, 8, 9, 115

(56) References Cited

U.S. PATENT DOCUMENTS

| | | |
|---|---|---|
| 4,490,914 A | 1/1985 | Spies |
| 5,121,116 A | 6/1992 | Taniguchi |
| 5,677,686 A * | 10/1997 | Kachi et al. ............... 341/115 |
| 6,029,118 A | 2/2000 | Strasser |
| 6,111,402 A | 8/2000 | Fischer |
| 6,242,906 B1 * | 6/2001 | Andermo .................... 324/202 |

FOREIGN PATENT DOCUMENTS

| | | |
|---|---|---|
| DE | 196 41 035 | 4/1998 |
| EP | 0 369 031 | 9/1993 |
| EP | 0 845 659 | 6/1998 |
| JP | 20-254459 | * 9/1998 |

* cited by examiner

Primary Examiner—Howard L. Williams
(74) Attorney, Agent, or Firm—Brinks Hofer Gilson & Lione

(57) ABSTRACT

A method for the absolute determination of the position of two objects, which are movable in relation to each other over a defined measuring distance. The method includes scanning a first measuring graduation with a first graduation period so as to generate a first periodic scanning signal and scanning a second measuring graduation with a second graduation period so as to generate a second periodic scanning signal, wherein the second graduation period is finer than the first graduation period. Correcting the first scanning signal with respect to its ideal phase position, in that a phase correction value is applied to the first periodic scanning signal and determining the phase correction value for at least a partial section of the measuring distance, wherein the phase correction value is a mean value from a maximum and a minimum phase position deviation of an actual phase position from a setpoint phase position in the at least one partial section.

31 Claims, 3 Drawing Sheets

METHOD AND DEVICE FOR ABSOLUTE POSITION DETERMINATION

Applicant claims, under 35 U.S.C. §119, the benefit of priority of the filing date of Oct. 6, 2000 of a German patent application, copy attached Serial Number 100 49 502.8, filed on the aforementioned date, the entire contents of which is incorporated herein by reference.

BACKGROUND OF THE INVENTION

1. Field of the Invention

The present invention relates to a method for the absolute determination of the position of two objects, which are movable in relation to each other over a defined measuring distance. The present invention further relates to a device for executing the method.

2. Discussion of Related Art

A device in accordance with the species, or a method in accordance with the species, for absolute position determination is known, for example, from FIG. 1 of EP 0 369 031 B1, which corresponds to U.S. Pat. No. 5,121,116, the entire contents of which are hereby incorporated herein by reference. As disclosed in EP 0 369 031 B1, scanning signals with different signal periods are obtained from scanning several measuring graduations with different graduation periods. Among the scanning signals there is also a signal, which only delivers one signal over the measurement distance and is therefore suitable for determining rough absolute position information. The different scanning signals are interpolated and subsequently combined into an absolute position information. The absolute position information has a resolution corresponding to the scanning signals with the highest resolution. A definite relative phase position of the different scanning signals must be assured for the correct determination of an absolute position by the combination of the different scanning signals of differing signal periods. If there is an undefined phase offset between the periodic scanning signals of different signal periods, for example as illustrated in FIG. 5 of EP 0 369 031 B1, an error results when determining the absolute position information. For example, such an undefined phase offset can be the result of tolerances inherent in the production of the scanned measuring graduations, or on the part of the respective scanning units.

For solving these problems it is therefore proposed by EP 0 369 031 B1 to correct the scanning signals of adjacent tracks with regard to an ideal phase position with each other. To this end, phase correction values are applied to the interpolated scanning signals of adjacent measuring graduation tracks. The determination of a suitable correction value for the phase position correction takes place by an iterative method at several sampling times in that overlapping areas of digital position data words in adjacent tracks with different resolution are compared to each other. However, the proposed method for determining correction values requires a not inconsiderable outlay. Moreover, in the presence of a large phase position error at one of the sampling times it is not assured that an accurate correction value can be determined.

OBJECTS AND SUMMARY OF THE INVENTION

It is therefore an object of the present invention to further develop the method in accordance with the species, or the device in accordance with the species, in such a way that a dependable phase position correction between the scanning signals of different measuring graduations is assured with the least possible outlay in circuitry.

This object is attained by a method for the absolute determination of the position of two objects, which are movable in relation to each other over a defined measuring distance. The method includes scanning a first measuring graduation with a first graduation period so as to generate a first periodic scanning signal and scanning a second measuring graduation with a second graduation period so as to generate a second periodic scanning signal, wherein the second graduation period is finer than the first graduation period. Correcting the first scanning signal with respect to its ideal phase position, in that a phase correction value is applied to the first periodic scanning signal and determining the phase correction value for at least a partial section of the measuring distance, wherein the phase correction value is a mean value from a maximum and a minimum phase position deviation of an actual phase position from a setpoint phase position in the at least one partial section.

The above mentioned object is furthermore attained by a device for the absolute position determination of a first object and a second object, which can be moved with respect to each other in a measuring direction. The device includes a first graduation extending in a measuring direction over a defined measuring distance having a first graduation period and a second graduation extending in the measuring direction over the defined measuring distance, having a second graduation period, wherein the second graduation period is finer than the first graduation period, and the first and second graduations are each connected with a first object. A scanning unit, which is connected with a second object for scanning the first and second graduations and generating first and second periodic scanning signals and at least one correcting unit that applies a phase correction value to at least one of the first and second periodic scanning signals, wherein the phase correction value is selected for at least one partial section of the measuring distance as a mean value from a maximum and a minimum phase position deviation of an actual phase position from a setpoint phase position in the at least one partial section.

The steps in accordance with the present invention now assure that a phase position of the scanning signals of adjacent measuring graduations results over the entire measuring distance, which permits a correct determination of the absolute position from these signals. To this end a suitable phase correction value for at least a partial section is determined prior to the measuring operation by a calibration measurement along the entire measuring distance. A phase correction value determined in this way assures that during the actual measuring operation a maximally tolerable phase offset between the different first and second scanning signals is not exceeded in this partial section. If the partial section is selected to equal the entire measuring distance, only a single phase correction value is required. Alternatively to this, it is also possible to divide the measuring distance into several partial sections, for each of which separate phase correction values are determined in accordance with the invention and stored as a function of the position. In this case, the measuring distance results from the sum of the different partial sections. During the measuring operation, the readout in accordance with the position of the phase correction values required for the respective partial section is performed from a data storage unit, which is organized in the form of a table.

The device required for this is constructed of simple circuitry and can also be expanded, depending on the demands made on the measuring system.

The process in accordance with the present invention can be employed in connection with the most diverse measuring systems and in particular is not limited to a particular scanning principle. Furthermore, the present invention can be employed in connection with linear measuring systems, as well as rotational measuring systems.

Further advantages, as well as details, of the present invention ensue from the following description of an exemplary embodiment by the attached drawings.

DETAILED DESCRIPTION OF THE PREFERRED EMBODIMENTS

Figure 1:
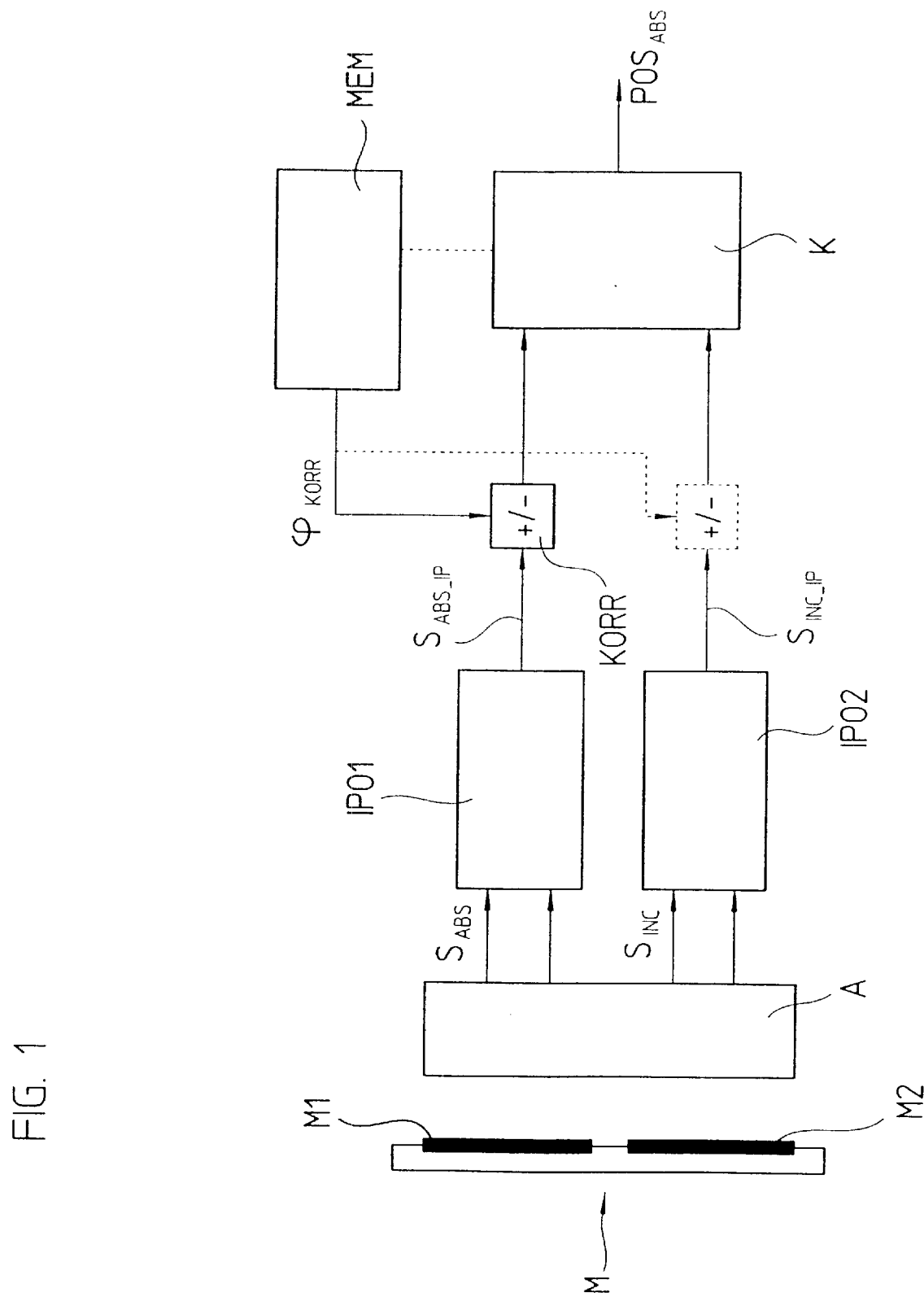
FIG. 1 is a schematic block diagram of an exemplary embodiment of a device in accordance with the present invention.

An exemplary embodiment of the device in accordance with the present invention is represented in FIG. 1 as a schematic block diagram. A scale M can be seen, which includes two measuring graduations M1, M2, and is scanned in the course of the measuring operation by a scanning unit A, which is movable relative to the scale M for generating position-dependent signals.

The two measuring graduations M1, M2 extend over the entire measuring distance D and have different graduation periods $TP_{ABS}$ and $TP_{INC}$. In this case, the graduation period $TP_{ABS}$ of the first measuring graduation M1 permits the generation of scanning signals $S_{ABS}$, which provide rough absolute position information within the measuring distance D. For example, the measuring graduation M1 can be laid out in such a way that a single signal period of a sinusoidal scanning signal $S_{ABS}$ results along the measuring distance D. In contrast to this, the graduation period $TP_{INC}$ of the second measuring graduation M2 is selected to be finer than the graduation period $TP_{ABS}$ of the first measuring graduation M1 and it makes possible the generation of incremental scanning signals $S_{INC}$ of a higher resolution. In this way it is possible, for example, to design the graduation period $TP_{INC}$ of the second measuring graduation M2 in such a way that a total N=8 signal periods of the periodic scanning signals $S_{INC}$ results along the measuring distance D.

Figure 2:
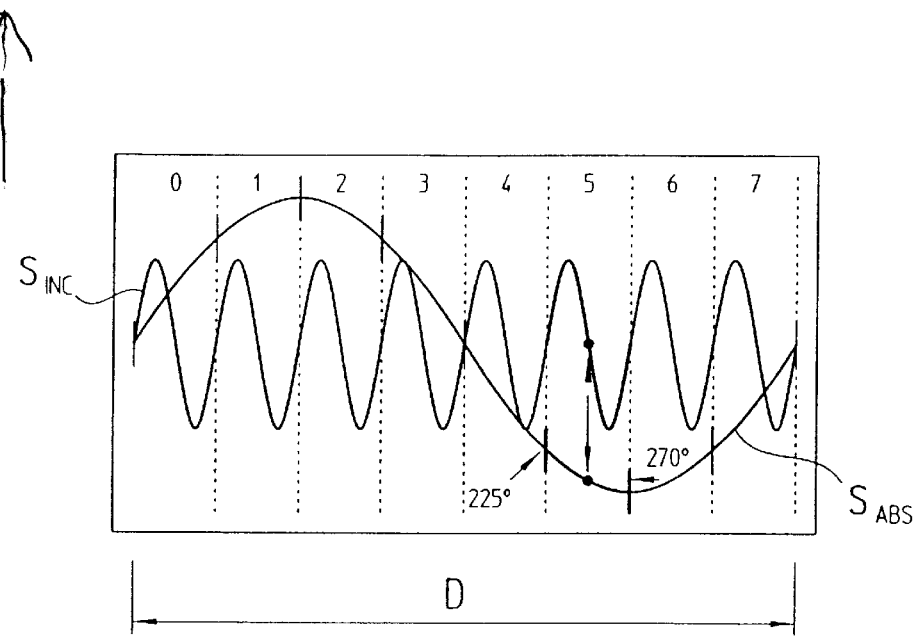
FIG. 2 is a representation of the first and second scanning signals along the measuring distance D in an error-free case for the device of FIG. 1.

The analog scanning signals $S_{ABS}$, $S_{INC}$ corresponding to this example are represented over the entire measuring distance D in an error-free case in FIG. 2.

The analog scanning signals $S_{ABS}$, $S_{INC}$ are each supplied to digital interpolation units IPO1, IPO2, in which interpolated data words, or interpolated scanning signals $S_{ABS\_IPO}$, $S_{INC\_IPO}$ are generated in a known manner from the analog scanning signals $S_{ABS}$, $S_{INC}$. Subsequently, the correction, still to be explained, of a possibly present phase offset between the first and the second scanning signals $S_{ABS}$, $S_{INC}$ by the data storage unit MEM and the correcting unit KORR takes place, before the corrected interpolated scanning signals $S_{ABS\_IPO}$, $S_{INC\_IPO}$ are supplied to a combining unit K. The combining unit K finally combines the interpolated and phase-corrected first and second scanning signals $S_{ABS}$, $S_{INC}$ into a digital data word, or an absolute position information $POS_{ABS}$, wherein the absolute position information $POS_{ABS}$ has a resolution which corresponds to the resolution of the second scanning signals $S_{INC}$, or of the relative position information obtained by its use. The absolute position information $POS_{ABS}$ is then available for further processing in a further sequential electronic arrangement, not represented, for example a numerical machine tool control.

Customarily a pair of scanning signals $S_{ABS}$, $S_{INC}$, phase shifted by 90°, is generated in a known manner, which is intended to be illustrated by the respective two arrows between the scanning unit A and the downstream connected signal processing components.

In a preferred embodiment of the device in accordance with the present invention it is used for detecting rotational movements, i.e. the scale M is embodied as a graduated disk, on which two tracks with the two measuring graduations M1, M2, which are arranged concentrically and rotationally symmetrically with respect to the axis of rotation, have been placed. 23. In this case, the measuring distance D corresponds to the circumference of the graduated disk. In the example of FIG. 2, D therefore corresponds to a complete turn of the graduated disk over 360°.

For generating the scanning signals $S_{ABS}$, $S_{INC}$ from the scanning of the measuring graduations M1, M2 it is of course possible to employ the most diverse physical scanning principles, for example optical, magnetic, capacitive or inductive scanning principles. Reference is made to EP 0 845 659 A2 of Applicant with regard to the suitable design of an inductively operating device, for example. Note that EP 0 845 659 corresponds to U.S. Pat. No. 6,111,402, the entire contents of which are hereby incorporated herein by reference.

Alternatively to a rotational measuring arrangement, it is of course also possible to design a linear measuring arrangement in accordance with the present invention. In the same way it is basically possible to also provide more measuring graduations, or respectively scanning signals, by the device in accordance with the present invention, which in principle are phase-corrected in the manner of the present invention.

Figure 3:
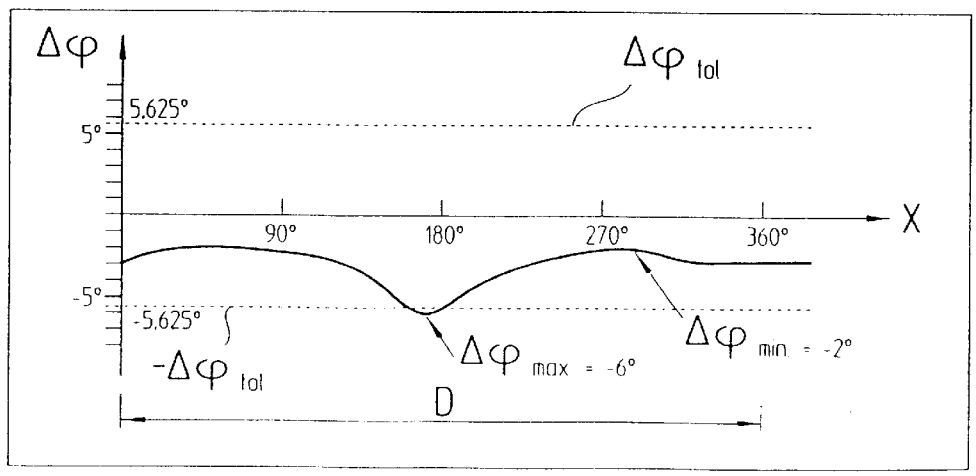
FIG. 3 is a representation for explaining an existing phase error for the device of FIG. 1.

The process in accordance with the present invention will now be described in greater detail by FIGS. 3 to 5, as well as FIG. 1. FIG. 3 shows the result of a calibration measurement, which takes place prior to the actual measuring operation of the position determination device. The position x, which is to be measured here, is plotted on the abscissa, in this case, the same as in the example of FIG. 2, the complete measuring distance D represents a full revolution of the graduated disk over 360°, i.e. the position x corresponds to an angular value between 0° and 360°. The phase deviation $\Delta\phi(x)$ determined in the positive and negative direction per calibration measurement is plotted as the ordinate, wherein the value $\Delta\phi(x)$ along the measuring distance is the result of the following:

$$\phi(x):=\phi_{ABS.SOLL}(x)-\phi_{ABS.IST}(x) \qquad \text{Equ. (1)}.$$

In accordance with Equation (1), the value $\Delta\phi(x)$ represents the deviation of the phase position of the first scanning signals $S_{ABS}$ from a setpoint phase position. In this case, the setpoint phase position is defined by the ideal phase position of the first scanning signals $S_{ABS}$ in relation to the second scanning signals $S_{INC}$, used as reference in this example.

The value $\phi_{ABS.SOLL}(x)$ here defines the absolute setpoint position value of the first scanning signals $S_{ABS}$ at a position x, while the value $\phi_{ABS.IST}(x)$ defines the accurate actual position value of the first scanning signals $S_{ABS}$ at the position x and thereby characterizes the ideal phase position.

If ideally there were no deviations from the setpoint phase shift, the phase position deviation $\Delta\phi(x)$ over the entire measuring distance D would be $\Delta\phi(x)=0$. However, as can be seen from FIG. 3, the phase position deviation $\Delta\phi(x)$ over the measuring distance D deviates from the ideal value $\Delta\phi(x)=0$ as a function of the position, i.e. there is a deviation between the setpoint phase shift and the actual phase shift of the first and second scanning signals $S_{ABS}$, $S_{INC}$, for example caused by tolerances during production of the respective graduated disk.

Figure 4:
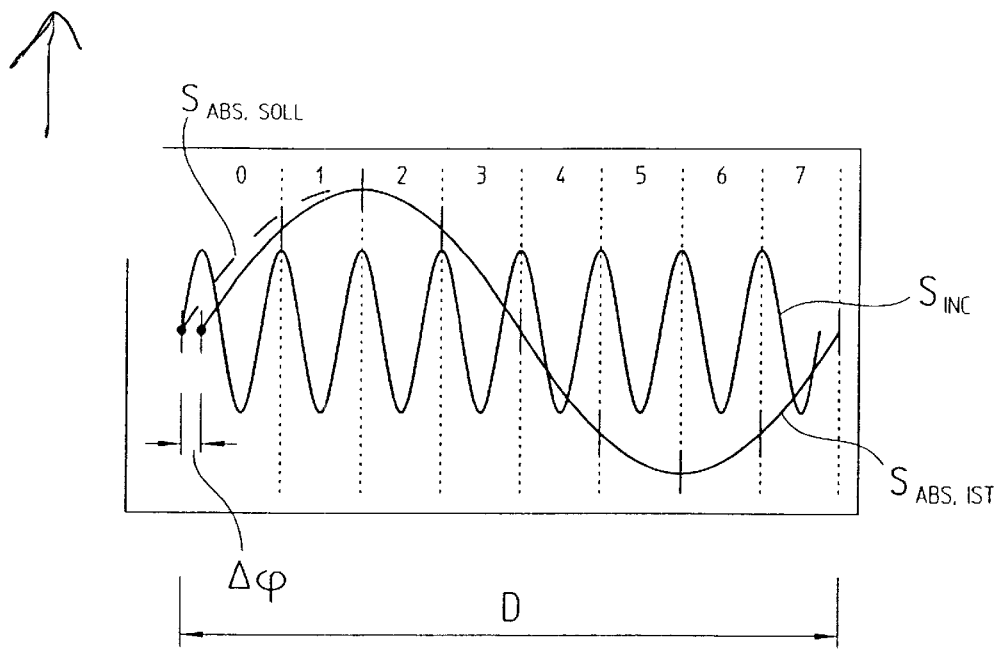
FIG. 4 is a representation of the first and second scanning signals along the measuring distance D when a phase error exists for the device of FIG. 1.

To illustrate the value $\Delta\phi(x)$, a representation of the first actual value scanning signals $\phi_{ABS.IST}(x)$ of the second scanning signals $S_{INC}$ in accordance with FIG. 2, is shown in FIG. 4, wherein a constant phase position deviation $\Delta\phi(x)$=const. exists over the entire measuring distance D. This means that for example the first scanning signals $S_{ABS}$ are displaced with respect to the ideal phase position by the fixed amount $\Delta\phi(x)$=const. over the entire measuring distance D. To illustrate the phase position deviation $\Delta\phi(x)$, a portion of the first setpoint value scanning signals $\phi_{ABS.SOLL}(x)$ is shown in dashed lines in FIG. 4.

In order to assure, as already discussed above, that no erroneous absolute position is determined from the combination of the first and second scanning signals $S_{ABS}$ and $S_{INC}$, the phase position deviation $\Delta\phi(x)$ must not exceed a defined phase position tolerance value $\pm\Delta\phi_{tol}$. In this case the phase position tolerance value $\pm\Delta\phi_{tol}$ is a function of the selected periodicities of the first and second scanning signals $S_{ABS}$ and $S_{INC}$. In the example of FIG. 3, the first periodic scanning signals $S_{ABS}$ supply a single signal period over the measuring distance D, and therefore made a rough absolute position determination along the measuring distance D possible. The second scanning signals $S_{INC}$, however, provides N=36 signal periods over the entire measuring distance D and in this way permit the generation of relative position information with a higher resolution than the first scanning signals $S_{ABS}$. In the example of FIG. 3, the phase position tolerance value $\pm\Delta\phi_{tol}$=5.625°, the respective threshold values are represented in the drawing figure. If the phase position deviation $\Delta\phi(x)$ lies outside the tolerance range defined by the phase tolerance value $\pm\Delta\phi_{tol}$, a correct absolute position determination from the scanning signals $S_{ABS}$, $S_{INC}$ is no longer possible. Accordingly, in the actual measuring operation it must be assured that the value $\Delta\phi(x)$ of the deviation of the setpoint phase position from the actual phase position always remains within the mentioned tolerance range, whose limits are defined by the phase position tolerance value $\pm\Delta\phi_{tol}$.

Generally, in connection with a position measuring device in which, similar to the above example, first scanning signals $S_{ABS}$ with one signal period over the measuring distance D, as well as second scanning signals $S_{INC}$ with N signal periods over the measuring distance D, are generated, the phase position tolerance value $\pm\Delta\phi_{tol}$ in relation to the relative phase position of the scanning signals can be stated as follows:

$$\Delta\phi_{tol}=\pm 180°/N \qquad \text{Equ. (2).}$$

If, as in the present case of FIG. 3, it is determined in a calibration measurement that the phase position deviation $\Delta\phi(x)$ does not lie within the tolerance range over the entire measuring distance D, in accordance with the present invention a phase correction value $\phi_{korr}$ is determined on the basis of the results of the calibration measurement in such a way that a maximally tolerable phase offset between the first and second scanning signals $S_{ABS}$, $S_{INC}$ is not exceeded, at least along a defined partial section of the measuring distance D. A phase deviation $\Delta\phi(x)$ exists approximately at the position $x\approx170°$ in the example of FIG. 3, which is located outside of the tolerance range defined by $\pm\Delta\phi_{tol}$ and therefore would lead to an error in the absolute position determination. To prevent such erroneous measurements, at least one phase correction value $\phi_{korr}$ is determined in a preferred variation of the present invention, which meets the following condition, at least over a partial section of the measuring distance D:

$$|\Delta\phi(x)+\phi_{korr}|<180°/N \qquad \text{Equ. (3).}$$

A particularly advantageous possibility for determining the phase correction value $\phi_{korr}$ consists for example in forming a mean value from the maxima $\Delta\phi_{max}$ and minima $\Delta\phi_{min}$, determined in the calibration measurement, of the phase deviation value $\Delta\phi(x)$ in accordance with the following equation:

$$\phi_{korr}=-(\Delta\phi_{max}+\Delta\phi_{min})/2 \qquad \text{Equ. (4).}$$

Accordingly, in the example of FIG. 3, with measured values $\Delta\phi_{max}=-6°$ and $\Delta\phi_{min}=-2°$, a required phase correction value $\phi_{korr}=4°$ would result.

Thus, in this example the partial section therefore corresponds to the entire measuring distance D, i.e. only a single phase correction value $\phi_{korr}$ is determined for the entire measuring distance D and is accordingly used for the phase position correction during the measuring operation.

Alternatively to this it is also possible to divide the measuring distance D into a predetermined number n of partial sections $D_i$ (i=1 . . . n) and to determine phase correction values $\phi_{korr.i}$ for each partial section $D_i$ in the manner explained above. In this case, the entire measuring distance D corresponds to the sum of the different partial sections $D_i$, for example, the complete rotation over 360° of a graduated disk can be divided into n=10 partial sections of 36°, and accordingly ten different phase correction values $\phi_{korr.i}$ (i=1 . . . 10) can be determined, etc. This means that maxima $\Delta\phi_{max}$ and minima $\Delta\phi_{min}$ of the phase deviation $\Delta\phi(x)$ are again determined in each partial section $D_i$ and a phase correction value $\phi_{korr.i}$ for the respective partial section $D_i$ is determined from this in accordance with Equation (5) as the mean value from the maximum and minimum phase position deviation $\Delta\phi_{max}$, $\Delta\phi_{min}$.

An accordingly determined phase correction value $\phi_{korr}$, or several phase correction values $\phi_{korr.i}$, are converted into one, or several binary numbers and stored in a data storage device MEM, as indicated in FIG. 1. In actual measuring operations, the phase correction value $\phi_{korr}$ is applied to the interpolated first scanning signals $S_{ABS-IPO}$ via the correcting unit KORR, i.e. the respective phase correction value $\Delta\phi_{korr}$ is added to the interpolated scanning signals $S_{ABS-IPO}$.

In the case of several stored phase correction values $\phi_{korr.i}$, the latter are stored for the different partial sections in a suitable data storage device, which is organized as a table, as a function of their positions, and are read out as a function of their positions during the measuring operation and used for corrections. This exemplary embodiment is indicated in FIG. 1 by the dashed connection between the data storage device MEM and the combining unit K, it is intended by this to illustrate that within the scope of the present invention it is also possible to provide a correction of the phase position as a function of the positions.

Depending on the memory capacity available, the entire measuring distance D can be finely divided into partial sections $D_i$, for example in case of a large memory capacity, into a large number of partial sections, for which accordingly also a large number of phase correction values $\phi_{korr,i}$ are determined. In this connection it is conceivable in particular to select the partial sections to be so small that in the end a suitable phase correction value is available for each position along the measuring distance D.

Figure 5:
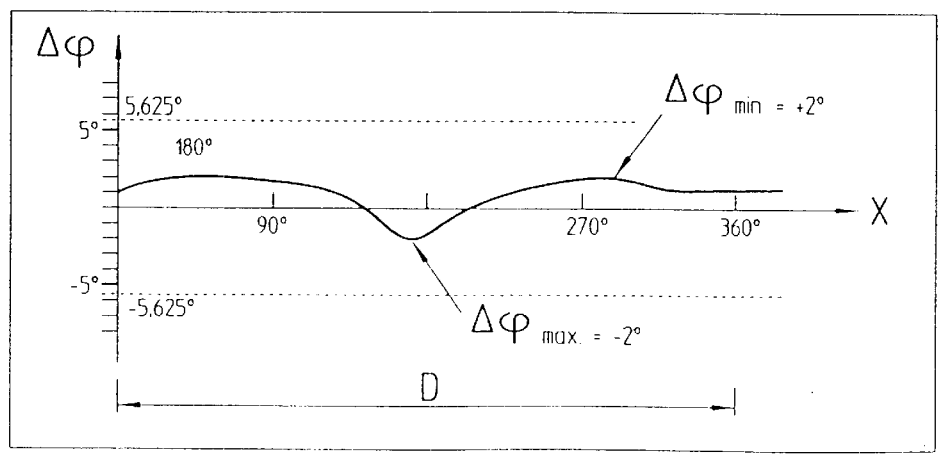
FIG. 5 is the representation of FIG. 3 following the performance of a correction of the phase error in accordance with the present invention.

The result of a repeated measurement can be seen in FIG. 5, wherein the phase correction in accordance with the invention was applied. It can be clearly seen here that now the phase position deviation $\Delta\phi(x)$ remains within the required tolerance range over the entire measuring distance D, and in this way a correct determination of the absolute position is everywhere possible.

While in the example of FIG. 1 the determined phase correction value $\Delta\phi_{korr}$ has been applied only to the first interpolated scanning signals $S_{INC-IPO}$, it is of course alternatively possible to apply suitably determined phase correction values $\Delta\phi_{korr}$ only to the second scanning signals $S_{INC-IPO}$, or to apply suitable phase correction values to the first, as well as the second, scanning signals. To this end it would respectively be necessary to arrange a correction unit KORR' downstream of the second interpolating unit IPO2, as indicated in FIG. 1.

The foregoing description is provided to illustrate the invention, and is not to be construed as a limitation. Numerous additions, substitutions and other changes can be made to the invention without departing from its scope as set forth in the appended claims.

I claim:

1. A method for the absolute determination of the position of two objects, which are movable in relation to each other over a defined measuring distance; comprising:
   scanning a first measuring graduation with a first graduation period so as to generate a first periodic scanning signal;
   scanning a second measuring graduation with a second graduation period so as to generate a second periodic scanning signal, wherein said second graduation period differs from said first graduation period;
   correcting said first scanning signal with respect its ideal phase position, in that a phase correction value is applied to said first periodic scanning signal; and
   determining said phase correction value for at least one partial section of said measuring distance, wherein said phase correction value is a mean value from a maximum and a minimum phase position deviation of an actual phase position from a setpoint phase position in said at least one partial section.

2. The method in accordance with claim 1, further comprising performing a calibration measurement that determines said phase correction value.

3. The method in accordance with claim 2, wherein said performing a calibration measurement is performed prior to said scanning said first measuring graduation and said scanning said second measuring graduation.

4. The method in accordance with claim 1, wherein said first scanning signal provides a rough absolute position information within said measuring distance; and
   said second scanning signal provides a relative position information at a resolution, which is higher than a resolution of said absolute position.

5. The method in accordance with claim 4, wherein said first scanning signal comprises a single signal period over said measuring distance, while said second scanning signal comprises N signal periods over said measuring distance.

6. The method in accordance with claim 5, wherein said phase correction value meets the condition $$|\Delta\phi(x)+\phi_{korr}|<180°/N$$

over said entire measuring distance, wherein $\Delta\phi(x)$ is a phase position deviation of said actual phase position of said first and second scanning signals from said ideal setpoint phase position as determined along a measuring direction x.

7. The method in accordance with claim 1, further comprising interpolating said first and second periodic scanning signals.

8. The method in accordance with claim 7, further comprising combining said interpolated first and second interpolated scanning signals into an absolute position information, whose resolution corresponds to a resolution of a relative position information.

9. The method in accordance with claim 1, further comprising determining only a single phase correction value; and wherein said partial section corresponds to said entire measuring distance.

10. The method in accordance with claim 9, further comprising storing said phase correction value.

11. The method in accordance with claim 10, further comprising converting said phase correction value to a binary number prior to said storing.

12. The method in accordance with claim 9, wherein said phase correction value meets the condition $$|\Delta\phi(x)+\phi_{korr}|<180°/N$$

over said entire measuring distance, wherein $\Delta\phi(x)$ is a phase position deviation of said actual phase position of said first and second scanning signals from said ideal setpoint phase position as determined along a measuring direction x.

13. The method in accordance with claim 1, further comprising determining a phase correction value for several different partial sections, wherein a sum of said different partial sections corresponds to said measuring distance.

14. The method in accordance with claim 13, further comprising storing said phase correction values for said different partial sections as a function of their position in a data storage device, which is organized in the form of a table, and
   reading out said phase correction values as a function of their position from said data storage device and are used for correction.

15. The method in accordance with claim 1, wherein said second graduation period is finer than said first graduation period.

16. The method in accordance with claim 1, wherein said applying said phase correction to said first periodic scanning signal corrects a phase difference between said first periodic scanning signal and said second periodic scanning signal that are at different resolutions with respect to each other.

17. A device for the absolute position determination of a first object and a second object which can be moved with respect to each other in a measuring direction, comprising:
   a first graduation extending in a measuring direction over a defined measuring distance having a first graduation period;
   a second graduation extending in said measuring direction over said defined measuring distance, having a second graduation period, wherein said second graduation period differs from said first graduation period, and said first and second graduations are each connected with a first object;

a scanning unit, which is connected with a second object for scanning said first and second graduations and generating first and second periodic scanning signals; and at least one correcting unit that applies a phase correction value to at least one of said first and second periodic scanning signals, wherein said phase correction value is selected for at least one partial section of said measuring distance as a mean value from a maximum and a minimum phase position deviation of an actual phase position from a setpoint phase position in said at least one partial section.

18. The device in accordance with claim 17, further comprising a first interpolating unit and a second interpolating unit for interpolating said first and second scanning signals.

19. The device in accordance with claim 18, wherein said at least one correcting unit is arranged downstream of one of or both of said first and second interpolating units, and wherein said at least one correcting unit applies said phase correction value to said interpolated first scanning signal.

20. The device in accordance with claim 19, further comprising a data storage unit containing phase correction values for correcting said first periodic scanning signal in relation to an ideal phase position.

21. The device in accordance with claim 19, wherein said at least one correcting unit is arranged only downstream of either said first interpolating unit or said second interpolating unit for correcting said phase position of said first and second scanning signals in relation to each other.

22. The device in accordance with claim 19, wherein said at least one correcting unit is arranged downstream of said first and second interpolating units for correcting said phase position of said first and second scanning signals in relation to each other.

23. The device in accordance with claim 18, further comprising a combining unit arranged downstream of said first and second interpolating units that combines said first and second interpolated scanning signals into an absolute position information, whose resolution corresponds to a resolution of a relative position information.

24. The device in accordance with claim 17, wherein said first graduation comprises only a single graduation period over said measuring distance, while said second graduation comprises N graduation periods over said measuring distance.

25. The device in accordance with claim 17, further comprising a combining unit that combines said first and second scanning signals into an absolute position information, whose resolution corresponds to a resolution of a relative position information.

26. The device in accordance with claim 17, wherein said first and second graduations are arranged rotationally symmetrical around an axis of rotation.

27. The device in accordance with claim 17, further comprising a data storage device, in which at least one phase correction value is stored.

28. The device in accordance with claim 27, wherein phase correction values for several partial sections are stored in said data storage device.

29. The device in accordance with claim 17, wherein said scanning unit is an inductive scanning unit.

30. The device in accordance with claim 17, wherein said second graduation period is finer than said first graduation period.

31. The device in accordance with claim 17, wherein said applying said phase correction to at least one of said first and second periodic scanning signal corrects a phase difference between said first periodic scanning signal and said second periodic scanning signal that are at different resolutions with respect to each other.

* * * * *